United States Patent

Becker

[11] 3,913,503
[45] Oct. 21, 1975

[54] APPARATUS FOR PLANTING INDIVIDUAL SEEDS IN PREDETERMINED LOCATIONS

[75] Inventor: Reinhard Becker, Oberweser, Gieselwerder, Germany

[73] Assignee: Karl Becker KG, Gieselwerder, Germany

[22] Filed: Dec. 14, 1973

[21] Appl. No.: 424,801

[30] Foreign Application Priority Data
Dec. 15, 1972 Germany............................ 2261344

[52] U.S. Cl. .................. 111/77; 221/124; 221/236; 198/104; 111/85; 222/413
[51] Int. Cl.².......................................... A01C 7/18
[58] Field of Search ........... 221/82, 84, 85, 86, 203, 221/236, 237, 253, 266, 277, 124; 222/197, 218, 217, 336, 344, 345, 413–415; 111/77; 198/54, 56–58, 104, 287

[56] References Cited
UNITED STATES PATENTS

| | | | |
|---|---|---|---|
| 413,033 | 10/1889 | Cook | 111/77 |
| 428,346 | 5/1890 | Mueller | 222/413 |
| 3,292,768 | 12/1966 | Mathews | 221/237 |
| 3,292,818 | 12/1966 | Jaworski | 221/203 |

FOREIGN PATENTS OR APPLICATIONS

| | | | |
|---|---|---|---|
| 261,001 | 10/1970 | U.S.S.R. | 111/77 |
| 937,519 | 9/1963 | United Kingdom | 111/77 |

Primary Examiner—Drayton E. Hoffman
Assistant Examiner—H. Grant Skaggs
Attorney, Agent, or Firm—Ralf H. Siegemund

[57] ABSTRACT

A single seed planter has a compartment carrier, drum or belt, continuously running in a casing which has an opening from which to dispense seed. The compartments are filled in the upper portion of the planter with one seed per compartment. A feed worm is disposed adjacent the opening of the casing and receives the seeds as dropping from the opening. Feed worm and compartment carrier are driven in synchronism, and the worm moves the seed down for planting them into the ground at regular spacing and along a rather straight line. The feed worm is contained in a tube but projects therefrom at the lower end.

11 Claims, 5 Drawing Figures

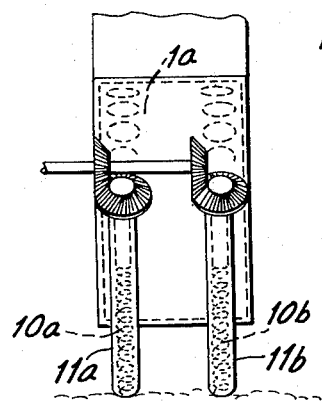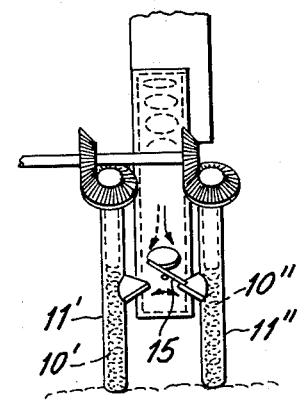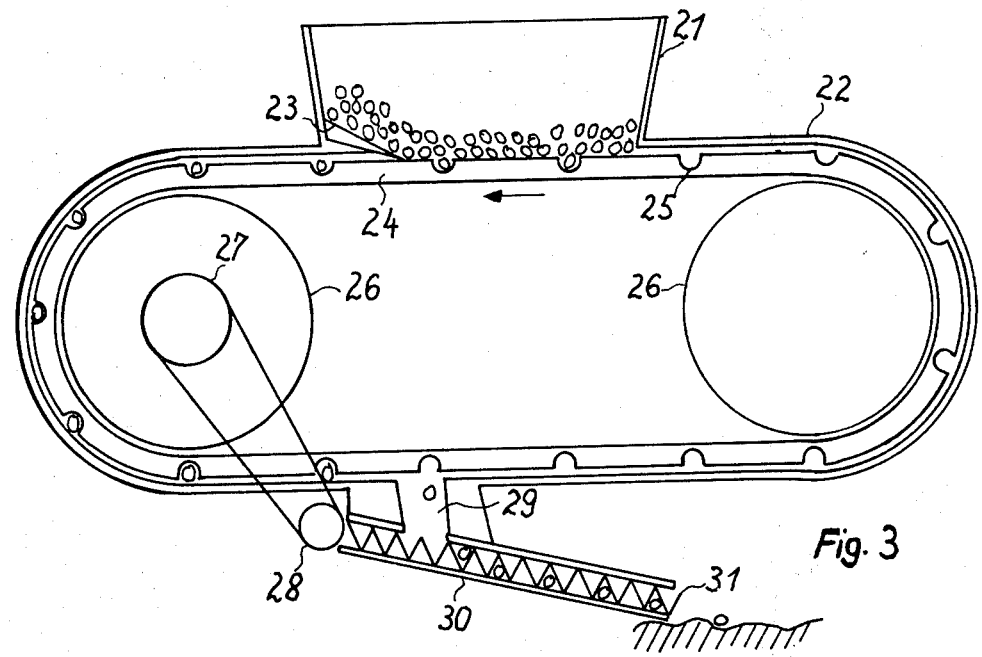

APPARATUS FOR PLANTING INDIVIDUAL SEEDS IN PREDETERMINED LOCATIONS

BACKGROUND OF THE INVENTION

The present invention relates to an apparatus for planting seed e.g. in a furrow, and more particularly the invention relates to improvements in signle seed planting machines placing one seed at a time into a furrow at rather accurately determined distance from seed to seed.

Planters to be improved in accordance with the present invention comprise for example a drum or belt with peripheral, open compartments for laying the seed, and the seeding machine is constructed to fill the compartments but remove excess seed so that, for example, only one seed remains in each compartment. The compartment carrier (drum or belt) undergoes continuous motion and drops the seeds from a particular distance which is to be as small as possible.

As stated, the planting machine should distribute and place the seed at predetermined distance from seed to seed. Accuracy here depends to a considerable extent on the construction of the planter, but speed of the compartment carrier and surface contour of the soil underneath are additional parameters to be considered. Assume the case of a seeding drum with peripheral compartments and rotating on a horizontal axis. The compartments are filled with seed in the top portion of the drum. As the drum turns the seed will tend to fall out but is held, for example, in a casing until the compartment has reached an opening, and the seed drops to the ground.

It has to be observed, that due to rotation of the drum the seed will not just drop, but a tangential component of motion is also imparted upon the seed so that its path down follows a parabola. Moreover, the seed is accelerated in a direction which is additionally determined by the orientation of the compartment wall which pushes the seed as it is just about to fall through the opening. Therefor, the seed does not only receive a tangential motion but also lateral motion to one side or the other. Of course, acceleration is the larger, the higher the speed of the drum. An endless belt as compartment carrier produces the same effect. The same is true for a compartment drum which rotates on a vertical axis.

It can thus be seen, that each seed is pushed out of the machine at a rather high speed (depending on the carrier speed) and will be accelerated further by free fall. The seed will, therefor, impact on ground at a considerable speed, often with a lateral component of motion and may roll away. This tendency is even more pronounced when the soil is fairly hard. Moreover, the path differs from grain to grain and seed may roll away laterally to one side or the other. Therefor, the placing of the individual seeds may not have sufficient accuracy, and steps must be taken to prevent the seed from rolling too far from the desired point of planting.

SUMMARY OF THE INVENTION

It is an object of the present invention to improve machine seeding so that the seeds are directly placed on the ground, i.e. they are to be layed down and not thrown down. It is, therefor, a particular object of the invention to place seed on the ground so that it will not roll away but stays here having been placed.

In accordance with the preferred embodiment of the invention a seeding machine or planter with casing, compartment carrier and exit opening in the casing is improved by providing a feed worm in oblique, downwardly directed orientation and running from the opening of the planter down to the immediate vicinity of the soil. The feed worm is contained in a tube whose axis coincides with the worm axis. The tube has a lateral upper opening communicating with an opening of the compartment carrier casing. The worm is driven in synchronism with the movement of the compartment carrier, so that seed as it leaves a compartment is moved down by the feed worm, one seed after another, for regular placement on the ground at the bottom end of the feed worm. The worm may actually penetrate the surface of the soil so that a seed is actually screwed into the ground. Thus, strictly speaking the seed is not placed onto the ground (though this is, of course, possible) but into the ground to make sure in the best possible manner it will stay in place.

A pressure roller may be mounted next to the encased feed worm to cover the seed and tamping the soil firmly avoiding air pockets around the seed. Since the feed worm rotates to convey seed towards ground, the worm cleans itself continuously even though ploughing through ground. Each seed is, thus, moved by the worm towards and into the ground. As the worm recedes, the seed stays in place.

The two openings, one in the feed worm tube the other one in the compartment carrier casing have to match, and the carrier should actually be quite close to the upper portion of the feed worm so that a seed will be moved with certainty from a compartment of the carrier onto the feed worm. It is more or less inevitable that a seed leaves the compartment at a finite speed, but upon closely positioning the worm thereto, the path of accelerated movement of the seed is quite short, and particularly any lateral deviations from a mean travel path remain small accordingly. Since the free motion of the seed is stopped quite early, the travel path of the seed remains rather well defined particularly when moved down by the thread of the feed worm.

At least the lower worm portion should be somewhat flexible, at least so the extent it projects from the lower end of the tube so that it can adapt itself better to the soil conditions and surface irregularities (rocks). The pitch of the ridge and groove helices of the feed worm must be sufficiently large so that even the largest seed will not remain stuck in the worm. One will need here different feed worms for different size seeds.

The compartment carrier, drum or belt, is driven by and in the planter and the same drive is used for the feed worm. The feed worm can be geared to the carrier drive by means of bevel gears, a drive chain, flexible shafts, or the like.

DESCRIPTION OF THE DRAWINGS

While the specification concludes the claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 shows a second example of the preferred embodiment; and

FIGS. 4 and 5 show modifications for seeding two or more rows in parallel and simultaneously.

Proceeding now to the detailed description of the drawings, FIG. 1 shows a single seed planter with a drum 1 in a casing 2, also shaped in parts as a drum. The drum 1 has individual compartments along its periphery and facing the inner wall of the drum shaped portion of casing 2. The compartments are open in radially outwardly extending direction, but they are funnel shaped with a small opening in the center pointing towards the drum axis.

Figure 1:
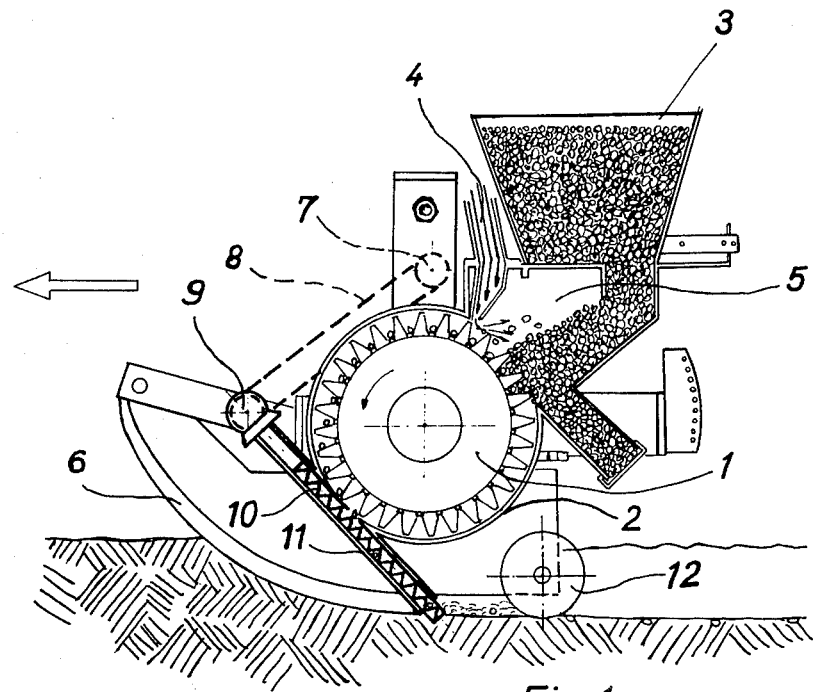
FIG. 1 is a section view of a planter improved in accordance with the preferred embodiment of the invention, showing the seeding machine in operation.

A hopper 3 is provided in the upper part of the machine and can be considered an upper extension of the casing. A plough blade 6 is mounted to the front of the machine, as seen in direction of movement as a whole. The blade ploughs a furrow in the soil.

A feeder portion 5 of the hopper places seed into the compartments as they emerge from the lower portion of the drum shaped casing 2 and pursuant to rotation, in the drawing, in counter clockwise direction. A nozzle 4 feeds air towards the compartments to blow all seeds but one out of each compartment.

The drum 1 is driven by a drive 7 to rotate in counter clockwise rotation as stated, so that each compartment holding a seed is moved down. However the casing 2 matches the contour of the drum particularly in the lower portion of the machine, and the wall of the casing is quite closely spaced from the drum, so that the seed is held in the compartments even when tending to fall out.

A tube 11 is mounted to the casing in that the axis of tube 11 runs at least approximately parallel to a tangential direction of drum 1. Tube 11 has a lateral opening 14 which, is aligned with an opening 13 in casing 2. Particularly, 14 denotes the opening in the inner wall of tube 11 and this opening is slightly separated by the opening 13 as defined in the inside surface wall of casing 2. Seed can fall out of a compartment when passing these openings and into the tube 11.

Tube 11 contains a feed worm 10 which is driven by a worm gear 9 which in turn is driven by a chain or belt 8 which is driven by drive 7 which is the drive for the drum 1. Drive 7, chain or belt 8 and worm gear 9 constitutes a means for driving the seed carrier which is drum 1 in synchronism with the feedworm 10. The worm is driven in such a direction that the seed will be moved down towards the lower end of the worm.

The worm 10 extends obliquely in down direction and towards the rear with respect to movement of the planter and seeding machine as a whole (which is to the left of FIG. 1). Due to the direction of worm rotation sand cannot enter the machine and the down movement is in effect a self cleaning action.

The worm 10 actually projects beyond the lower end of tube 11 and penetrates slightly the surface soil in the ploughed furrow. Accordingly, the individual seed is actually screwed into the soil. A tamping roller 12 in the rear of the machine presses the seed into the soil and covers it. Usually, a rather firm soil in the immediate vicinity of a seed is beneficial for germination.

Figure 2:
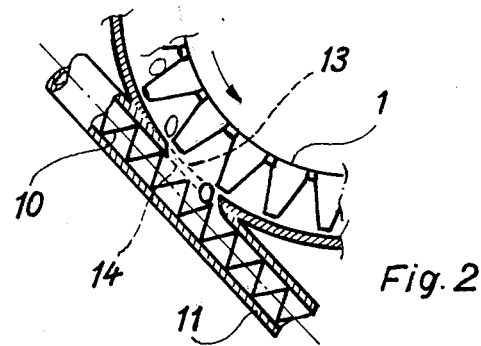
FIG. 2 is an enlarged detail of the planter shown in FIG. 1.

FIG. 2 shows in greater detail relevant features related to the transfer of seed from the compartments to the feed worm. The opening 13 of the casing is to be selected in accordance with the radial outer opening of a compartment in drum 1. That is to say, opening 13 should be slightly larger than a peripheral compartment opening. Opening 13 should be about equal in size to opening 14 but with a slightly funnel shaped transition. The diameter and pitch of the worm is to be selected in accordance with opening 14 so that with certainty a seed can be received by the worm and will not be blocked by a helical ridge thereof. The helical groove of the worm must be sufficiently large to accomodate even the largest seed of the type that is being sown.

The individual seeds leave their respective compartments at a speed which is directly related to the rotational speed of drum 1. In view of the down component they are moved more or less in the direction of extension of the tube and of the axis of the worm. It may be advantageous to let the seed hit a baffle first before it is placed on the worm to obtain a reduction of speed of the moving seed.

The planter may be required to seed different types seed, i.e. seed of differing size and contour, not at the same time of course. Accordingly, drums with smaller or larger compartments will be used as required. Consequently, one will use differently dimensioned worms for purposes of size adaptation. The casing 2 is part of the machine and remains in place so that the opening 13 is a fixed parameter. However, for different seed worms one may use different tubes; they may differ as to wall thickness for example so as to accomodate different diameter worms. Alternatively, one may interpose a funnel piece between tube 11 and casing 2 i.e. between opening 13 and opening 14.

It is advisable to construct the worm at least at its lower end from flexible material, so that the worm is better capable of adapting itself to the soil condition and unevenesses thereof and avoids rocks etc.

Previously it was required to use one compartment drum per row to be sown. The present invention permits utilization of one compartment carrier 1a with several peripheral, axially spaced rows of compartments as shown in FIG. 4. Two feed worms, 10a and 10b, one for each row are connected at corresponding spacing to the carrier casing. This construction permits using one machine for seeding two rows in parallel. Each worm has its own tubular casing, 11a and 11b respectively. A common drive may be used for all feed worms.

An alternative construction can be derived from FIG. 5 in that a single row of compartments of a drum, rotating at twice the speed as before, feeds two rows of seeds. Two sorms $10^1$ and $10^{11}$ are used respectively in tubular casings $11^1$ and $11^{11}$. An alternating deflector 15 feeds alternatingly seed to one and the other worm. The deflection plate 15 serves also as baffle here to stop the feed as it is thrown out of opening 13 in casing 2.

Turning now to FIG. 3, there is illustrated a planter using a belt with compartments rather than a drum. Again there is a casing 22 with a hopper 21 on top, and an endless belt 24 serves, so to speak, as a movable bottom of the hopper. The belt has indentations 25 serving as compartments. The belt loops around two wheels or drums 26, one of them being driven to move the belt continuously.

Each compartment 25 is supposed to contain one seed only, and a stripper 23 removes excess seed. In lieu of the mechanical stripper 23 one can also use an air nozzle blowing excess seed out of each compartment. It is necessary in this case to have a bore in each indentation 25, smaller than the smallest seed.

The belt leaves the hopper, in the drawing to the left, with but one seed per compartment. The seed is carried along and held against the inner wall of casing 22. The seed actually falls onto the inner wall surface of the casing in the lower belt portion, but the compartment still covers it and carries it along. Of course, the belt as such must run quite closely to the casing to prevent escape and wedging of a seed between belt and casing outside of the compartment into which the seed was placed initially.

The casing has a funnel shaped 29 in the lower portion through which each seed falls onto a feed worm 31. The worm 31 is contained in a tubular casing 30 which is affixed to the casing 22 of the machine. The casing 30 has a corresponding opening registering with the bottom opening of casing 22 so that indeed the seed will fall directly onto the feed worm.

The feed worm 31 is driven in synchronism with the belt 24. Accordingly, a drive gear or pulley 27 is connected to one of the reels or drums 26 and a chain or belt driven by gear or pulley 27 drives a gear or pulley 28 which in turn drives the worm 31.

The planter is driven appropriately across the field and seeds are placed by the worm at appropriate spacing onto or into the soil.

The invention is not limited to the embodiments described above but all changes and modifications thereof not constituting departures from the spirit and scope of the invention are intended to be included.

I claim:

1. In a planter for placing seed individually onto or into the soil and having a casing with a carrier such as a drum or belt with particularly spaced compartments and movably disposed inside of the casing, further having means for separating seeds from a bulk and placing individual seeds into the individual compartments, the casing having an opening along which the compartments pass in sequence and through which a seed may drop out of the respective compartment when passing the opening, the improvement comprising:

a feed-worm with helical ridge and groove having an upper and lower portion and having a pitch in relation to said compartment spacing such that the feedworm as it rotates can receive from said opening only a single seed at a time between any two adjacent ridges the upper protion being located adjacent said opening to receive seeds falling through, the lower portion extending to the soil underneath the machine;

a tubular casing containing the feedworm and affixed to the casing of the machine and having an opening adjacent said opening in the casing of the machine; and means for synchronously driving said compartment carrier and said worm, so that the seeds as disposed from the compartments onto the feed worm are moved down by the feed-worm in spaced apart relation as established by the passage of the compartments past said openings and maintained by the worm as moving the seeds down the tubular casing for direct depositing onto or into the soil.

2. In a planter as in claim 1, the pitch of the ridge of the worm being selected so that the groove is larger than the seed to be received.

3. In a planter as in claim 1, the worm being flexible at least in its lower portion.

4. In a planter as in claim 1, the tubular casing being shorter at its lower end than the worm, so that the worm projects beyond the tubular casing.

5. In a planter as in claim 1, and including a funnel shaped transition between the opening of the casing of the machine and the opening of the tubular casing.

6. In a planter as in claim 1, and including a tamping roller directly behind the lower end of the worm.

7. In a planter as claim 1, wherein the compartment carrier has several rows of compartments, there being a corresponding number of feed worms, each cooperating with a row of compartments for seeding a corresponding number of parallel rows.

8. In a planter as in claim 1, wherein the compartment has a row of compartments, and two adjacently positioned feed worms, and means for alternatingly feeding seeds from the compartments to the feed worms for providing two rows of seeds.

9. In a planter for placing seed individually onto or into the soil and having a revolving carrier, such as a drum or belt with particularly spaced compartments arranged along the periphery thereof, the planter having additionally means for separating individual seeds from a bulk of seeds and placing them into the individual compartments ahead of a particular location, so that only one seed lodges in each compartment, the improvement comprising:

an obliquely positioned, downwardly inclining feedworm having helical ridge and groove and extending from the planter to and reaching the soil underneath;

a tubular casing, open at the bottom and receiving the feedworm, the casing being affixed to the planter and having an upper opening adjacent to said particular location, the feedworm has a pitch in relation to said compartment spacing such that the feedworm as it rotates can receive from said upper opening only a single seed at a time between any two adjacent ridges;

first means disposed at said particular location for causing a seed in a compartment when arriving at said particular location to drop through said upper opening onto the feedworm; and second means for driving the carrier and the feedworm in synchronism so that the feedworm moves the seeds down in engagemrnt with the ridge and placing the seeds onto or into the soil in spaced-apart relation.

10. In a planter as in claim 9, wherein at least the end of the worm is flexible.

11. In a planter as in claim 9, wherein the first means is part of a casing for said carrier having an opening at said particular location through which a seed falls and onto the feedworm.

* * * * *